US 7,647,292 B2

(12) United States Patent
Hayashi

(10) Patent No.: US 7,647,292 B2
(45) Date of Patent: Jan. 12, 2010

(54) DOCUMENT MANAGEMENT NETWORK SYSTEM FOR MANAGING ORIGINAL DOCUMENT INFORMATION AND ADDITIONAL INFORMATION

(75) Inventor: Yasuhiro Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 271 days.

(21) Appl. No.: 11/110,888

(22) Filed: Apr. 21, 2005

(65) Prior Publication Data

US 2005/0240560 A1      Oct. 27, 2005

(30) Foreign Application Priority Data

Apr. 21, 2004    (JP) .............................. 2004-125594

(51) Int. Cl.
*G06F 7/00*    (2006.01)
*G06F 17/00*    (2006.01)

(52) U.S. Cl. .............................. 707/1; 707/10; 715/234

(58) Field of Classification Search ..................... 707/1, 707/3, 8–9, 200, 201, 204; 715/234
See application file for complete search history.

(56) References Cited

U.S. PATENT DOCUMENTS

| 6,266,683 | B1 * | 7/2001 | Yehuda et al. | ............... 715/234 |
| 6,640,306 | B1 | 10/2003 | Tone et al. | |
| 6,757,871 | B1 * | 6/2004 | Sato et al. | ................... 715/530 |
| 6,981,214 | B1 * | 12/2005 | Miller et al. | ................. 715/234 |
| 7,136,178 | B1 * | 11/2006 | Gupta et al. | ............... 358/1.15 |
| 2002/0078171 | A1 * | 6/2002 | Schneider | ................... 709/218 |
| 2002/0156853 | A1 * | 10/2002 | Hyakutake et al. | .......... 709/206 |
| 2003/0225766 | A1 * | 12/2003 | Furumoto | ...................... 707/9 |

FOREIGN PATENT DOCUMENTS

| JP | 5-056425 | 3/1993 |
| JP | 6-266589 | 9/1994 |
| JP | 2000-222394 | 8/2000 |
| JP | 2002-163273 | * 11/2000 |
| JP | 2002-163273 | 6/2002 |
| JP | 2003-67373 | 3/2003 |
| JP | 2003-178071 | 6/2003 |

* cited by examiner

*Primary Examiner*—Wilson Lee
(74) *Attorney, Agent, or Firm*—Young & Thompson

(57) ABSTRACT

A document delivery server is connected to a user terminal through a network. The document delivery server includes a transmission/reception portion, memory portions that store original document information and public additional information respectively, storage control portions that store and read out the original document information and public additional information together with the memory portions, and a browse information separation/composition portion that transmits the original document information and public additional information to the user terminal through the transmission/reception portion. The terminal includes a transmission/reception portion, a memory portion that stores personal additional information, a storage control portion that stores and reads out the personal additional information together with the memory portion, and a browse information separation/composition portion that composites the original document information and public additional information sent from the transmission/reception portion and the personal additional information read out from the memory portion.

16 Claims, 12 Drawing Sheets

FIG.2

| DOCUMENT ID | DOCUMENT NAME | ADDITIONAL USER ID | PUBLIC DESTINATION ID | ADDITIONAL INFORMATION FILE ID |
|---|---|---|---|---|
| 20031218-001 | AAA SYSTEM MANUAL | user 001 | user 002, user 003 | 20031218-comment 001 |
| 20031220-002 | BBB PRESENTATION MATERIAL | user 003 | user 002 | 20040108-notice 003 |

FIG.3

| DOCUMENT ID | DOCUMENT NAME | ADDITIONAL USER ID | PUBLIC DESTINATION ID | ADDITIONAL INFORMATION FILE ID |
|---|---|---|---|---|
| 20031218-001 | AAA SYSTEM MANUAL | user 001 | user 002, user 003 | 20031218-comment 001 |
| 20031218-001 | AAA SYSTEM MANUAL | user 001 | | 20031218-comment 002 |

FIG.4
```
#PAGE AREA (x1,y1,x2,y2) OPERATION
 12  10,10,200,30    highlight
 15  100,150,100,200 text:NOTICE
 30  10,10,50,50     rectangle
```
FIG.5
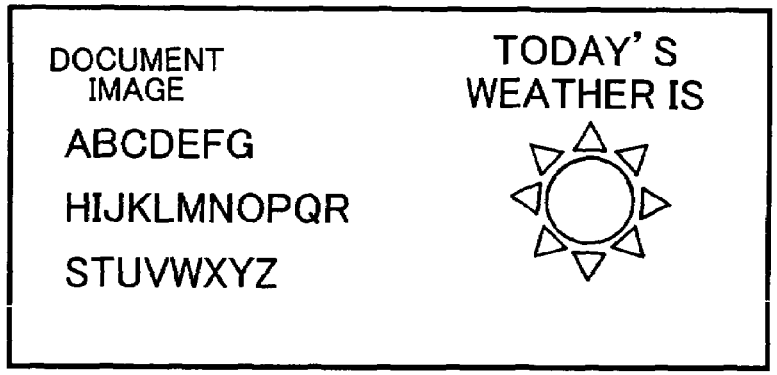
FIG.6
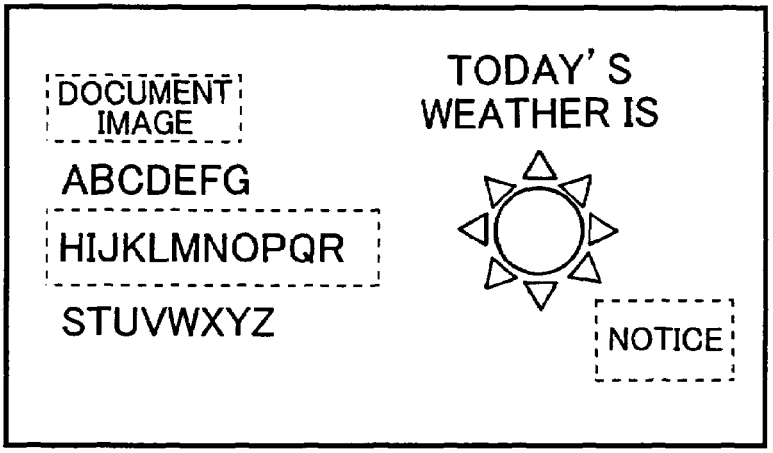

DOCUMENT MANAGEMENT NETWORK SYSTEM FOR MANAGING ORIGINAL DOCUMENT INFORMATION AND ADDITIONAL INFORMATION

BACKGROUND OF THE INVENTION

1. Field of the Invention

The present invention relates to a document management network system, a document delivery server, a terminal, a document management apparatus, a document management method and program and particularly, to a document management network system or the like for managing original document information and additional information (subjoined information).

2. Description of Related Art

In a conventional browse system in which a document is delivered to be browsed, there is employed a method of directly editing an original document to be delivered of the document delivery side, and additionally writing comments and markers.

As a technique related to the present invention, there is disclosed one technique in JPA 2000-222394 (FIG. 1), in which label information (sticky information) on a document to which a label (sticky) is stuck is extracted, extraction result of the label information and information on an original electronic document of the document to which the label is attached are made to correspond to each other to be stored, and the label information is attached to the original electronic document to form a document for display when display requirement is issued.

Furthermore, there is disclosed another technique in JPA 2002-163273 (FIG. 1), in which a component of an electronic document is specified, the specified component and its corresponding classification information are paired, and the paired information and the electronic document data are made to correspond to each other to be stored.

Furthermore, there is disclosed yet another technique in JPA 2003-178071 (FIG. 1), in which an area image of a figure or a picture is extracted and added to management information on a document image as attribution information to be saved.

However, in a system in which an original document to be delivered of the document delivery side is directly edited, and comments and markers are additionally written, an edited document has to be dealt with as a document different from the original document, or the original document has to be replaced. Furthermore, because of direct edit, it cannot be selected whether additionally written comments and markers are personally used or released to the public. Even though comments are additionally written to part of an original image, the whole image has to be restructured, and the original image has to be changed, which processing is inefficient.

SUMMARY OF THE INVENTION

According to first aspect of the present invention, there is provided a document management network system comprising a document delivery server and a terminal that is connected to the document delivery server through a network, the document delivery server comprising:

one or two first memory portions that store first information including of one or two of original document information, public additional information that can be made public and is to be additionally written to the original document information, and personal additional information that is to be additionally written to the original document information;

one or two first storage control portions that store and read out the first information together with the one or two first memory portions based on document information from the terminal, or based on the document information and user information; and a first information processing portion that transmits the first information read out by the one or two first storage control portions to the terminal, the terminal comprising:

an input portion that inputs the document information and the user information;

one or two second memory portions that store second information including of information obtained by excluding the first information stored in the one or two first memory portions from the original document information, the public additional information and the personal additional information;

one or two second storage control portions that store and read out the second information together with the one or two second memory portions based on the document information, or based on the document information and the user information; and a second information processing portion that combines the first information transmitted from the document delivery server and the second information read out by the one or two second storage control portions, and transmits the document information, or the document information and the user information to the document delivery server.

According to second aspect of the present invention, there is provided document delivery server comprising:

at least one memory portion that stores original document information and one or both additional information of public additional information that can be made public and is to be additionally written to the original document information and personal additional information that is to be additionally written to the original document information;

at least one storage control portion that stores and reads out the original document information and the one or both additional information together with the memory portion based on document information, or based on the document information and user information, which are transmitted from a terminal through a network; and an information processing portion that transmits the original document information and one or both additional information read out by the storage control portion to the terminal through the network.

According to third aspect of the present invention, there is provided a terminal comprising:

an input portion that inputs document information;

a memory portion that stores personal additional information that is to be additionally written to original document information, the original document information being including in information transmitted from a document delivery server through a network;

a storage control portion that stores and reads out the personal additional information together with the memory portion based on the document information; and an information processing portion that combines the personal additional information read out by the storage control portion and the information including the original document information.

According to fourth aspect of the present invention, there is provided a document management apparatus comprising:

an input portion that inputs document information and user information;

a first memory portion that stores original document information;

a first storage control portion that stores and reads out the original document information together with the first memory portion based on the document information;

a second memory portion that stores public additional information that can be made public and is to be additionally written to the original document information;

a second storage control portion that stores and reads out the public additional information together with the second memory portion based on the document information and the user information;

a third memory portion that stores personal additional information that is to be additionally written to the original document information;

a third storage control portion that stores and reads out the personal additional information together with the third memory portion based on the document information; and an information processing means that combines the original document information read out by the first storage control portion, the public additional information read out by the second storage control portion, and the personal additional information read out by the third storage control portion.

According to fifth aspect of the present invention, there is provided a document management method and a program product including the steps of:

inputting document information and user information by using an input means;

reading out original document information stored in a first memory means based on the document information, reading out public additional information stored in a second memory means which can be made public and is to be additionally written to the original document information based on the document information and the user information, and reading out personal additional information stored in a third memory means which is to be additionally written to the original document information based on the document information, by using a storage means that stores and reads out information; and combining the read out original document information, the read out public additional information and the read out personal additional information, by using an information processing means.

According to sixth aspect of the present invention, there is provided a document management method of a document delivery server and a program product including the steps of:

receiving document information and user information;

reading out original document information and one or both additional information of public additional information that can be made public and is to be additionally written to the original document information and personal additional information that is to be additionally written to the original document information stored in a memory means based on the document information, or based on the document information and the user information from the memory means, by using a storage means that stores and reads out information; and transmitting the read out original document information and the one or both additional information.

According to the present invention, additional information such as comments and markers can be additionally written without changing original document information. Furthermore, additional information such as additionally written comments and markers can be stored as a memorandum of an individual or made public.

BRIEF DESCRIPTION OF THE DRAWINGS

FIG. 2 shows a diagram indicative of the configuration of a public additional information table;

FIG. 3 shows a diagram indicative of the configuration of a personal additional information table;

FIG. 4 shows a diagram of one example of a public additional information file;

FIG. 5 shows a diagram of one example of an original document file;

FIG. 6 shows a diagram of a document having the original document file shown in FIG. 5 and surrounding frames and characters added thereto;

DETAILED DESCRIPTION OF THE PREFERRED EMBODIMENTS

Figure 1:
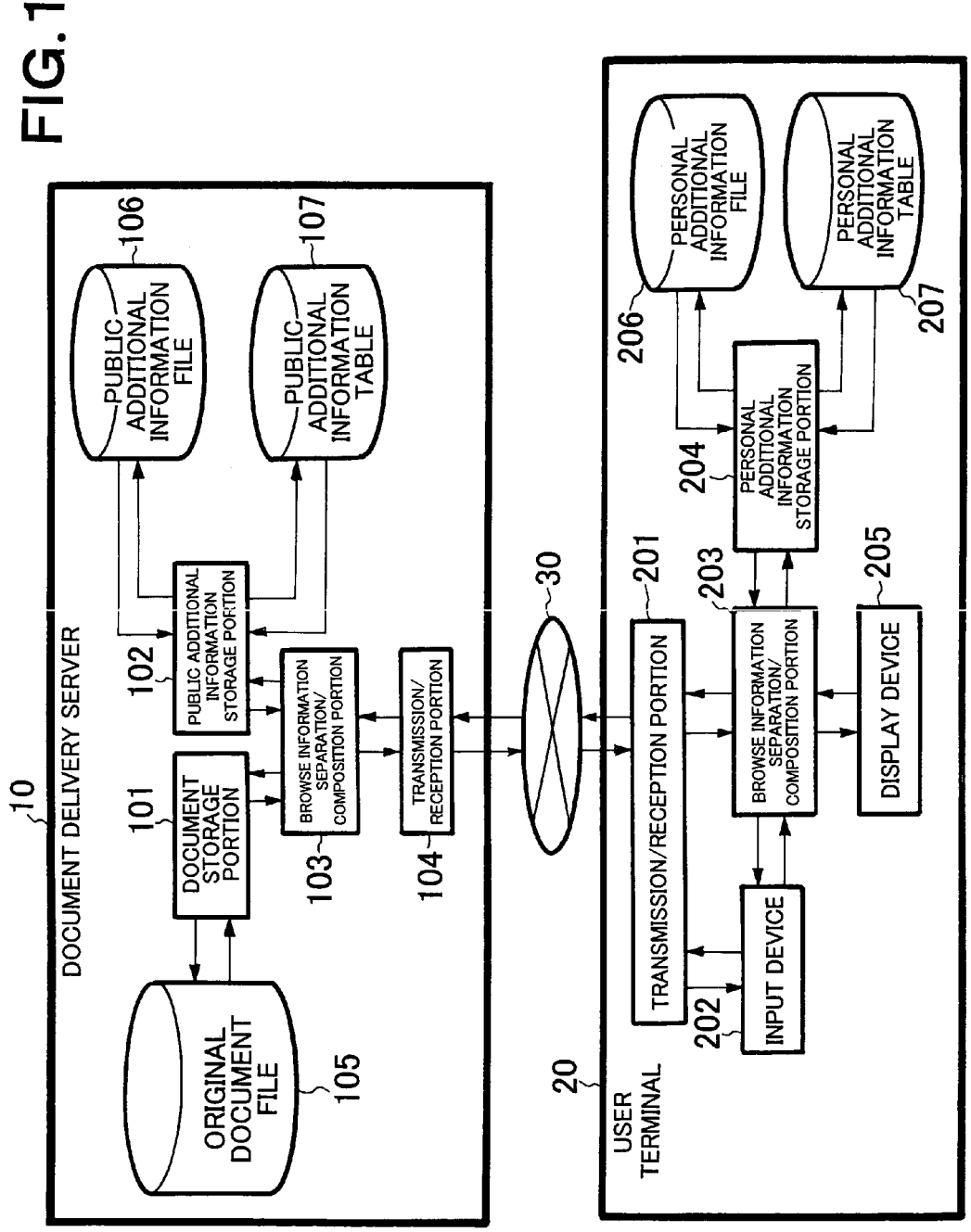
FIG. 1 shows a block diagram a representative embodiment and a first embodiment of a document public browse system according to the present invention.

Preferred embodiments of the present invention will further be described below with reference to the accompanying drawings.

The representative embodiment will be described in accordance with a constitutive diagram shown in FIG. 1. A browsing reader transmits a user ID (as user information) and a document ID (as document information) of a document wanted to be browsed to document delivery server 10 through input device 202 (working as an input portion) of user terminal 20. Document storage control portion 101 reads out a document corresponding to the document ID, such as, the JPEG, JPEG 2000, GIF or bitmap, from original document file (working as an original document memory portion) 105, and public additional information storage control portion 102 retrieves a record corresponding to the document ID from public additional information table 107. The public additional information table 107 includes a public destination ID to restrict public destination of additional information, and when the user ID of the browsing reader is included in the public destination ID, public additional information, which is permitted to be public, is read out from public additional information file (working as a public additional information memory portion) 106. The document delivery server 10 transmits thus read out original document and public additional information to the user terminal 20 through transmission/reception portion 104. The original document and public additional information may be combined (composed) to be transmitted to the user terminal 20.

The user terminal 20 retrieves a record corresponding to the document ID that the browsing reader input from personal additional information table 207, and reads out corresponding personal additional information from a personal additional information file (working as a personal additional information memory portion) 206. Browse information separation/composition portion (working as an information processing portion) 203 combines the original document and public additional information transmitted from the document delivery server 10 and the personal additional information, and displays a document to which comments and markers are additionally written on display device 205.

The browsing reader forms personal additional information and information on the personal additional information table, and public additional information and information on the public additional information table through the input device 202 of the user terminal 20. The browse information separation/composition portion 203 stores the information on the personal additional information table and personal additional information in the personal additional information table 207 and in the personal additional information file 206 through personal additional information storage control portion 204 of the user terminal 20. The public additional information and information on the public additional information table are transmitted to the document delivery server 10, and are stored in the public additional information table 107 and in the public additional information file 106 through the public additional information storage control portion 102.

As a result, additional information such as comments and markers can be additionally written without changing the original document, and the additional information can be stored as a memorandum of an individual, and can be made public to other selected browsing readers.

The document storage control portion 101 and original document file 105, the public additional information storage control portion 102, public additional information file 106, and public additional information table 107, the personal additional information storage control portion 204, personal additional information file 206, and personal additional information table 207 can be arbitrarily arranged in the document delivery server 10 and in the user terminal 20.

For example, in another embodiment different from the present embodiment, the document storage control portion 101 and original document file 105, the public additional information storage control portion 102, public additional information file 106 and public additional information table 107, and the personal additional information storage control portion 204, personal additional information file 206 and personal additional information table 207 may be arranged in the document delivery server 10 or in the user terminal 20. Furthermore, any one or two of the document storage control portion 101 and original document file 105, the public additional information storage control portion 102, public additional information file 106 and public additional information table 107, the personal additional information storage control portion 204, personal additional information file 206 and personal additional information table 207 can be arranged in the document delivery server 10.

Next, concrete embodiments of the present invention will be explained.

First Embodiment

As shown in FIG. 1, one embodiment of the document public browse system (document management network system) according to the present invention includes the document delivery server 10 and user terminal 20. The document delivery server 10 and user terminal 20 are connected through network 30.

The document delivery server 10 includes the document storage control portion 101, the public additional information storage control portion 102, browse information separation/composition portion (working as an information processing portion) 103, the transmission/reception portion 104, the original document file 105, the public additional information file 106 and the public additional information table 107.

The document storage control portion 101 has a function of storing and reading out an original document specified by a document ID (as document information) to/from the original document file 105.

The public additional information storage control portion 102 has a function of storing and reading out additional information such as comments and markers which can be made public and are to be additionally written to the original document specified by the document ID to/from the public additional information file 106, and a function of retrieving additional information which can be made public from public information to the original document and a user specified by the document ID and a user ID (as user information) together with the public additional information table 107.

The browse information separation/composition portion 103 has a function of combining the original document sent from the document storage control portion 101 and the additional information sent from the public additional information storage control portion 102, and transmitting thus combined information to the user terminal 20 through the transmission/reception portion 104, and a function of sending additional information and information of the additional information table transmitted from the user terminal 20 through the transmission/reception portion 104, to the public additional information storage control portion 102.

The user terminal 20 includes transmission/reception portion 201, the input device 202, the browse information separation/composition portion (working as an information processing portion) 203, the personal additional information storage control portion 204, display device 205, the personal additional information file 206 and the personal additional information table 207.

The input device 202 has an input function of specifying an ID of a document which a user wants to browse and that of the user, and a drawing function of entering additional information to a document specified by the ID. For example, the input device 202 is a keyboard or a mouse.

The transmission/reception portion 201 has a function of receiving an ID of a document from the input device 202, and transmitting thus received ID to the document delivery server 10, and a function of receiving an original document and public additional information from the document delivery server 10, and sending thus received information to the browse information separation/composition portion 203.

The browse information separation/composition portion 203 has a function of combining the original document and public additional information sent from the transmission/reception portion 201 and personal additional information sent from the personal additional information storage control portion 204, and sending thus combined information to the display device 205 as a document image having additional information added thereto.

Furthermore, the browse information separation/composition portion 203 stores the personal additional information and information on the personal additional information table sent from the input device 202 in the personal additional information file 206 and in the personal additional information table 207 through the personal additional information storage control portion 204, and transmits public additional information and information on the public additional information table sent from the input device 202 to the document delivery server 10 through the transmission/reception portion 201.

The personal additional information storage control portion 204 has a function of storing personal additional information and information on the additional information table sent from the browse information separation/composition portion 203 in the personal additional information file 206 and in the personal additional information table 207. The display device 205 has a function of displaying the document image having additional information added thereto sent from the browse information separation/composition portion 203. For example, the display device 205 is a monitor display.

(Description of Operation)

Next, the operation of the embodiment will be explained with reference to FIGS. 1 to 6, and flow charts shown in FIGS. 7 to 10.

Figure 7:
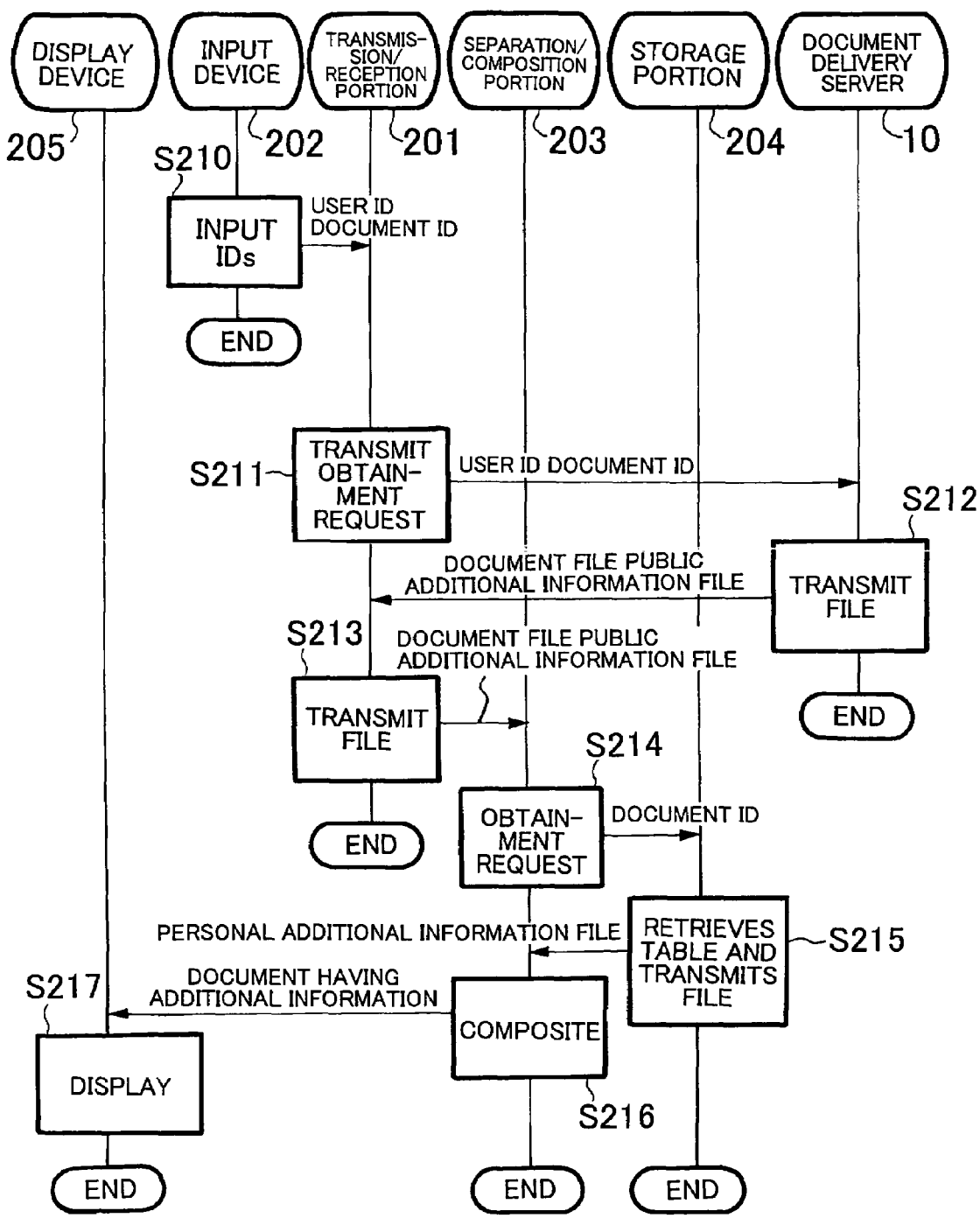
FIG. 7 shows a flow chart indicative of the operation of a user terminal.
Figure 8:
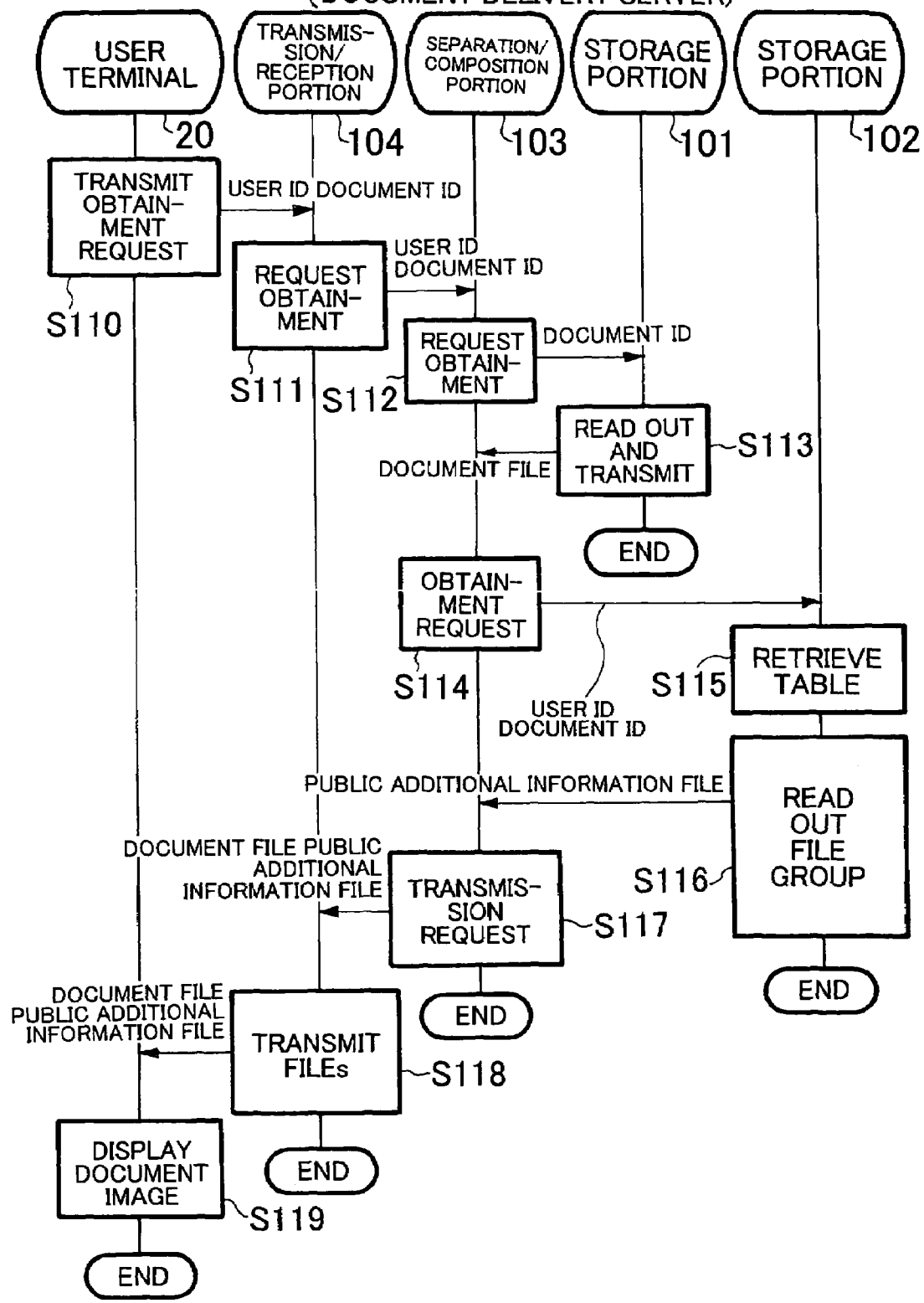
FIG. 8 shows a flow chart indicative of the operation of a document delivery server.

Referring to FIGS. 1 to 6, and flow charts shown in FIG. 7 and FIG. 8, the operation of adding public additional information and personal additional information to an original document stored in the document delivery server 10, and displaying the resultant information at the user terminal 20 will be explained.

The operation of the user terminal 20 will be explained referring to a flow chart shown in FIG. 7. A user inputs a user ID for identifying the user and a document ID for identifying a document wanted to be browsed by using the input device 202 so as to send a browse request to the transmission/reception portion 201 (step S210). The transmission/reception portion 201 transmits the user ID and document ID to the document delivery server 10 so as to obtain a specified document and public additional information which can be made public to the user (step S211).

The document delivery server 10 transmits an original document specified by the document ID and public additional information which can be made public to a user specified by the user ID to the transmission/reception portion 201 (step S212). The original document is a file including characters and figures shown in FIG. 5, and for example, is an image file such as, the JPEG or JPEG 2000. The original document may be a file including text information. The public additional information is a file including coordinates to be added and markers and text information to be added as shown in FIG. 4.

The transmission/reception portion 201 sends the document and public additional information transmitted from the document delivery server 10 to the browse information separation/composition portion 203 (step S213). The browse information separation/composition portion 203 sends the document ID to the personal additional information storage control portion 204 to make a request of obtaining personal additional information of a document specified by the document ID (step S214). The personal additional information is a file in which information similar to the public additional information shown in FIG. 4 is written.

The personal additional information storage control portion 204 retrieves the personal additional information table 207, and reads out additional information corresponding to the document ID from the personal additional information file 206 to send personal additional information to the browse information separation/composition portion 203 (step S215). The personal additional information table 207 includes a document ID, document name, additional user ID, public destination ID and additional information file ID, as shown in FIG. 3. The additional user ID is an ID of a user who adds additional information, while the public destination ID is an ID of a user who is permitted to be public. It is premised that, since personal additional information is stored in the user terminal 20, a user ID input at the input device 202 is included in the public destination ID (for example, when the user ID is "user 002", this ID is included in the public destination ID of the personal additional information table 207, as shown in FIG. 3), and the personal additional information can be retrieved and read out using the document ID alone. On the other hand, in case the personal additional information is stored in the document delivery server 10 (the personal additional information storage control portion 204, personal additional information file 206, and personal additional information table 207 are arranged in the document delivery server 10), with respect to the document ID and user ID input at the input device 202, when the input document ID accords with the document ID of the personal additional information table 207 and the input user ID is included in the public destination ID of the personal additional information table 207, the personal additional information is permitted to be retrieved and read out.

The browse information separation/composition portion 203 combines the original document and public additional information transmitted from the document delivery server 10 through the transmission/reception portion 201 and the personal additional information sent from the personal additional information storage control portion 204, and sends thus combined information to the display device 205 as a document image having additional information added thereto (step S216). The display device 205 displays the document image having additional information (step S217). The document image having additional information is a document which has the original document shown in FIG. 5 and surrounding frames and characters added thereto, as shown in FIG. 6.

The operation of the document delivery server 10 will be explained referring to a flow chart shown in FIG. 8.

The user terminal 20 transmits a user ID and document ID to the transmission/reception portion 104 so as to obtain a specified document and public additional information which can be made public to a user (step S110). The transmission/reception portion 104 receives the user ID and document ID, and sends thus received user ID and document ID to the browse information separation/composition portion 103 so as to obtain a specified document and public additional information (step S111).

The browse information separation/composition portion 103 sends the document ID to the document storage control portion 101 to make a request of obtaining an original document (step S112), and the document storage control portion 101 reads out a document corresponding to the document ID from the original document file 105 to send thus read out document to the browse information separation/composition portion 103 (step S113).

The browse information separation/composition portion 103 sends the user ID and document ID to the public additional information storage control portion 102 to make a request of obtaining the public additional information file which can be made public to a user specified by the user ID (step S114). The public additional information storage control portion 102 retrieves public additional information corresponding to the document ID from the public additional information table 107 (step S115), and, when the user ID is included in the public destination ID within the public additional information retrieval table, the public additional information storage control portion 102 reads out public additional information from the public additional information file 106 to send thus read out public additional information to the browse information separation/composition portion 103 (step S116). The configuration of the public additional information table 107 is similar to that of the personal additional information table 207 shown in FIG. 3, and includes a document ID, document name, additional user ID, public destination ID, and additional information file ID, as shown in FIG. 2. The public destination ID specifies a user ID which is permitted to be public. In this embodiment, it is intended that contents of an additional information file 20031218-comment 001 whose document name is "AAA system manual", which corresponds to a document whose document ID is 20031218-001, can be made public only to user 002 and user 003.

The browse information separation/composition portion 103 sends the original document and public additional information to the transmission/reception portion 104 to make a request of transmitting them to the user terminal 20 (step S117), and the transmission/reception portion 104 transmits thus received original document file and public additional information file to the user terminal 20 (step S118). The user terminal 20 forms a document image having additional information by using thus received original document and public additional information to display thus formed document to the user (step S119).

Next, the case that a browse request is sent from another user terminal except the user terminal 20 to the document delivery server 10 will be explained.

The personal additional information storage control portion 204, the personal additional information file 206 and the personal additional information table 207 are set on the document delivery server 10, and the public additional information storage control portion 102, the public additional information file 106 and the public additional information table 107 are set on the user terminal 20.

When a browse request including a document ID and a user ID is sent from another user terminal except the user terminal 20 to the document delivery server 10, the browse information separation/composition portion 103 requests an original document specified by the document ID and personal additional information of a document specified by the document ID, to the document storage control portion 101 and the personal additional information storage control portion 204. Further the browse information separation/composition portion 103 requests public additional information which can be made public to a user specified by the user ID to the user terminal 20. The browse information separation/composition portion 103 combines the original document, the personal additional information and the public additional information transmitted from the user terminal 20 and sends thus combined information to the another user terminal.

Figure 9:
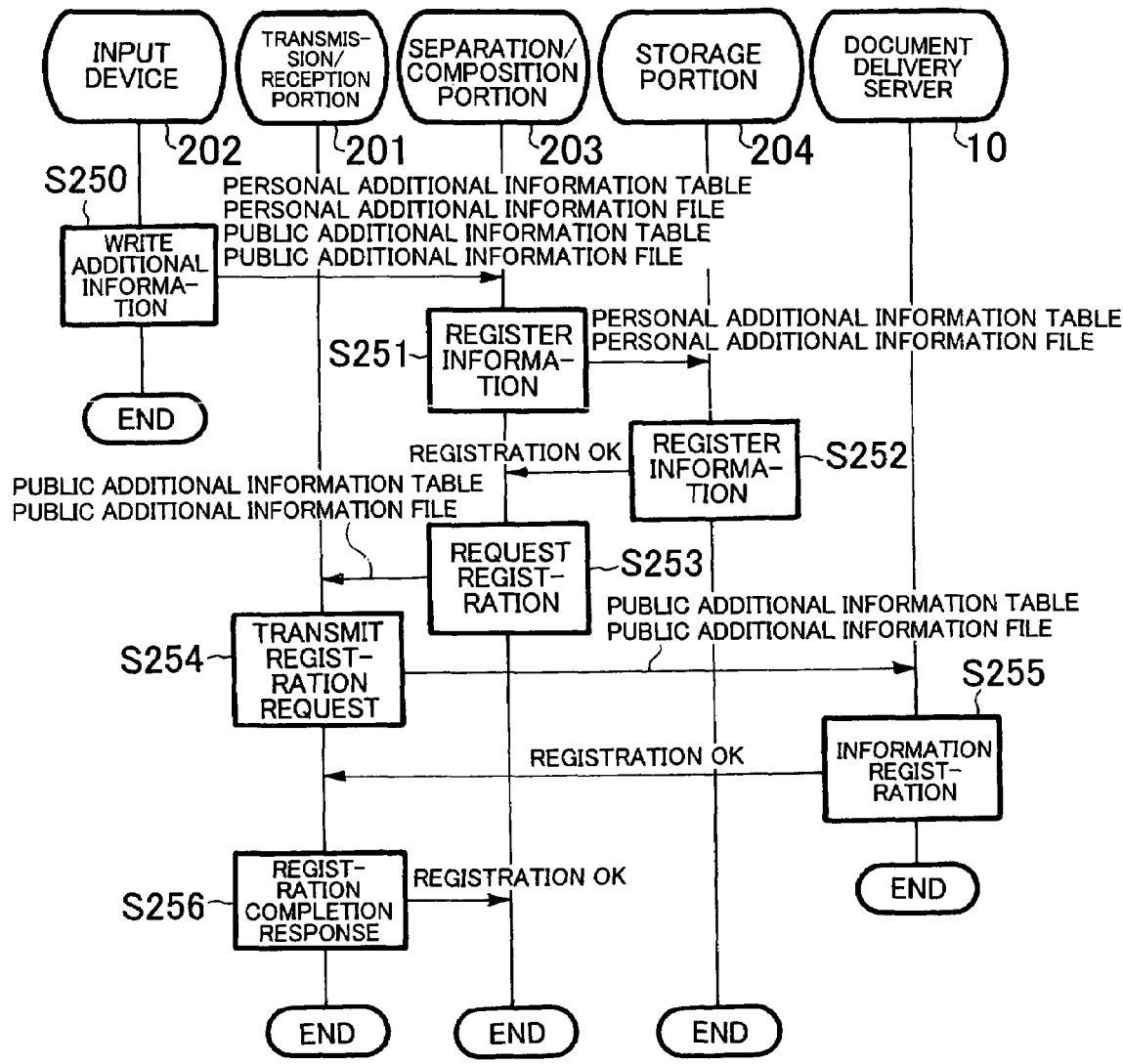
FIG. 9 shows a flow chart indicative of the operation of the user terminal.
Figure 10:
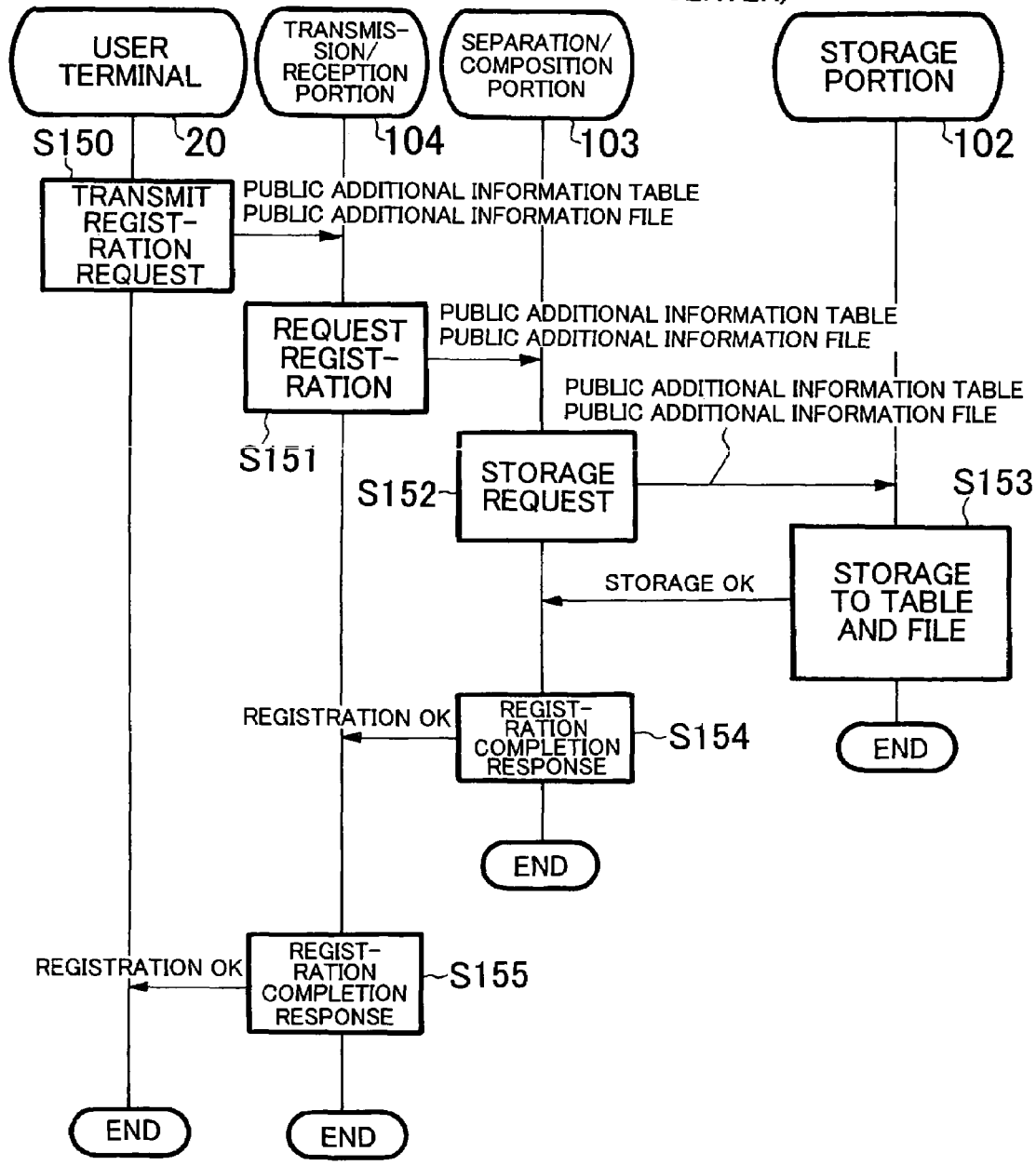
FIG. 10 shows a flow chart indicative of the operation of the document delivery server.

Referring to FIG. 1, FIGS. 3 to 6, and a flow charts shown in FIG. 9 and FIG. 10, the operation of storing added comments and markers in the user terminal 20 as personal additional information, and the operation of storing added comments and markers in the document delivery server 10 as public additional information to make them public will be explained.

Firstly, the operation of the user terminal 20 will be explained referring to a flow chart shown in FIG. 9. A user additionally writes information to a document by using the input device 202, and sends personal additional information, information on the personal additional information table, public additional information, and information on the public additional information table to the browse information separation/composition portion 203 (step S250). The personal additional information is information shown in FIG. 3.

The browse information separation/composition portion 203 sends thus received personal additional information and information on the personal additional information table to the personal additional information storage control portion 204 (step S251). The personal additional information storage control portion 204 stores information on the personal additional information table and the public additional information in the personal additional information file 206 and in the personal additional information table 207 (step S252). The browse information separation/composition portion 203 sends the public additional information and information on the public additional information table to the transmission/reception portion 201 to make a request of transmitting them to the document delivery server 10 (step S253), and the transmission/reception portion 201 transmits them to the document delivery server 10 through the network 30 (step S254).

The document delivery server 10 registers thus received public additional information and information on the public additional information table to transmit a notification of registration completion to the transmission/reception portion 201 (step S255), and the transmission/reception portion 201 sends the notification of registration completion to the browse information separation/composition portion 203 (step S256).

Next, the operation of the document delivery server 10 will be explained referring to a flow chart shown in FIG. 10.

The user terminal 20 transmits information on the public additional information table and public additional information to the transmission/reception portion 104 (step S150), and the transmission/reception portion 104 sends thus received information on the public additional information table and the public additional information to the browse information separation/composition portion 103 to make a request of registering the public additional information (step S151).

The browse information separation/composition portion 103 sends thus received information on the public additional information table and the public additional information to the public additional information storage control portion 102 to make a request of storing them (step S152), and the public additional information storage control portion 102 stores them in the public additional information file 106 and in the public additional information table 107 (step S153).

The browse information separation/composition portion 103 receives a notification of storage completion from the public additional information storage control portion 102 to send a notification of registration completion of the public additional information to the transmission/reception portion 104 (step S154). The transmission/reception portion 104 transmits a notification of registration completion to the user terminal 20 through the network 30 (step S155).

Second Embodiment

Figure 11:
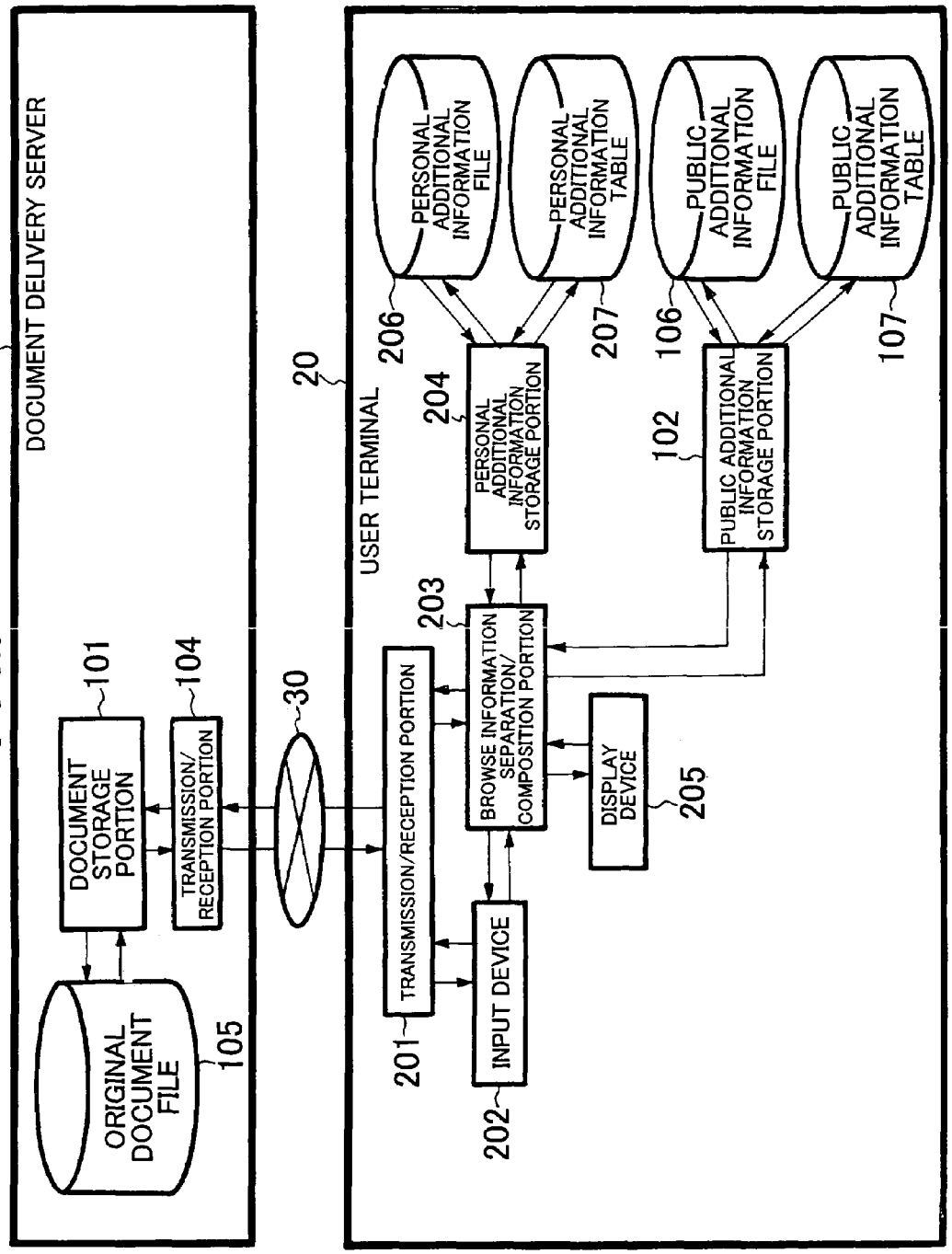
FIG. 11 shows a block diagram of a second embodiment of a document public browse system according to the present invention.

FIG. 11 shows a block diagram of a second embodiment of a document public browse system (document management network system) according to the present invention.

In the second embodiment, the public additional information storage control portion 102, public additional information file 106, and public additional information table 107 shown in FIG. 1 are arranged in the user terminal 20, while the browse information separation/composition portion 103 is not arranged, and the browse information separation/composition portion 203 of the user terminal 20 has part of the function of the browse information separation/composition portion 103 (information processing together with the public additional information storage portion 102).

In the second embodiment, memory capacity and a load of information processing in the document delivery server 10 can be reduced, which can simplify the configuration of the document delivery server 10.

Third Embodiment

Figure 12:
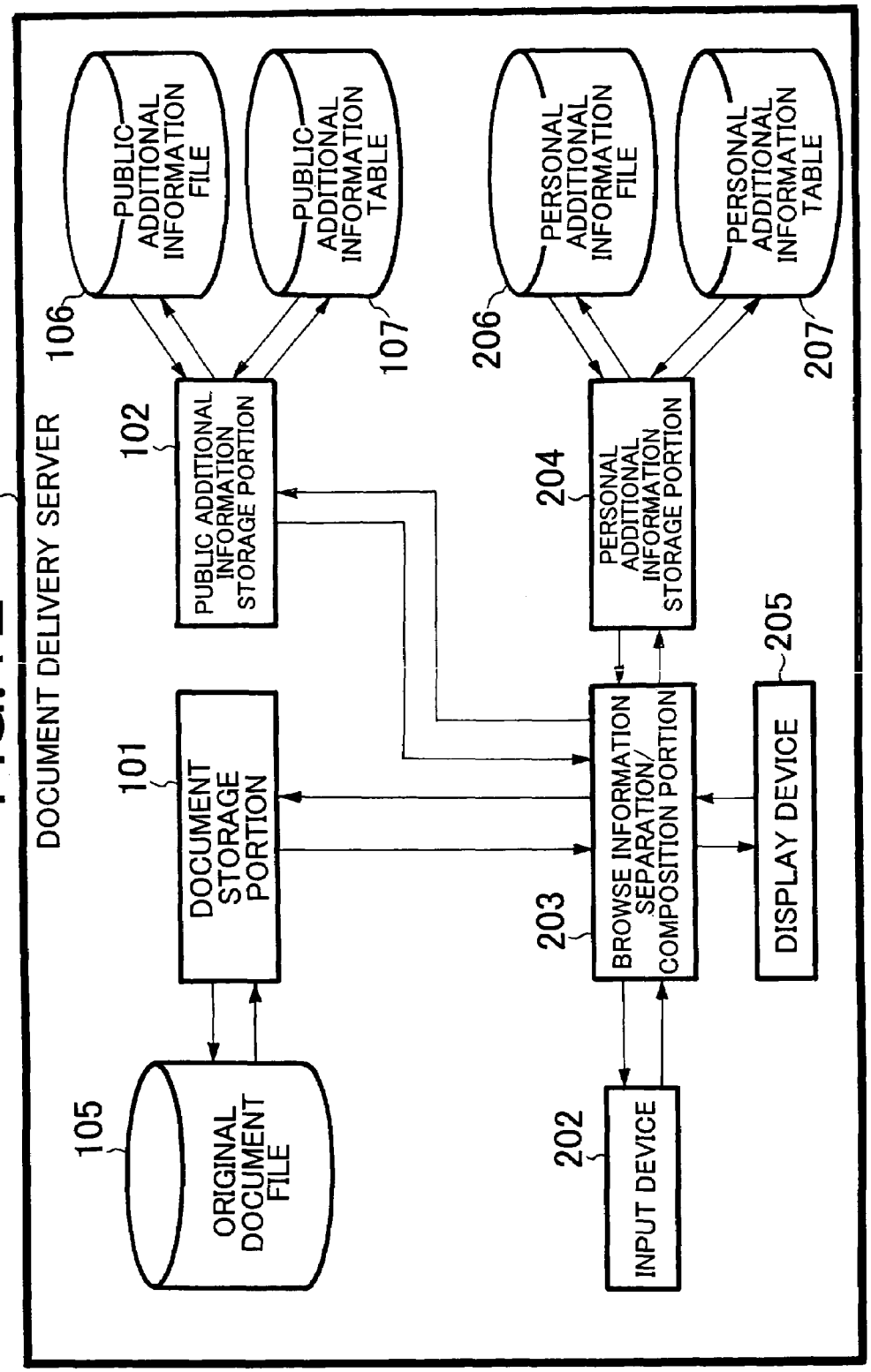
FIG. 12 shows a block diagram of a third embodiment of a document public browse system according to the present invention.

FIG. 12 shows a block diagram of a third embodiment of a document public browse system (document management apparatus) according to the present invention.

The third embodiment is an embodiment which constitutes the system shown in FIG. 1 without using a network. For example, a single personal computer constitutes document management apparatus 40 corresponding to the system shown in FIG. 1.

Fourth Embodiment

Figure 13:
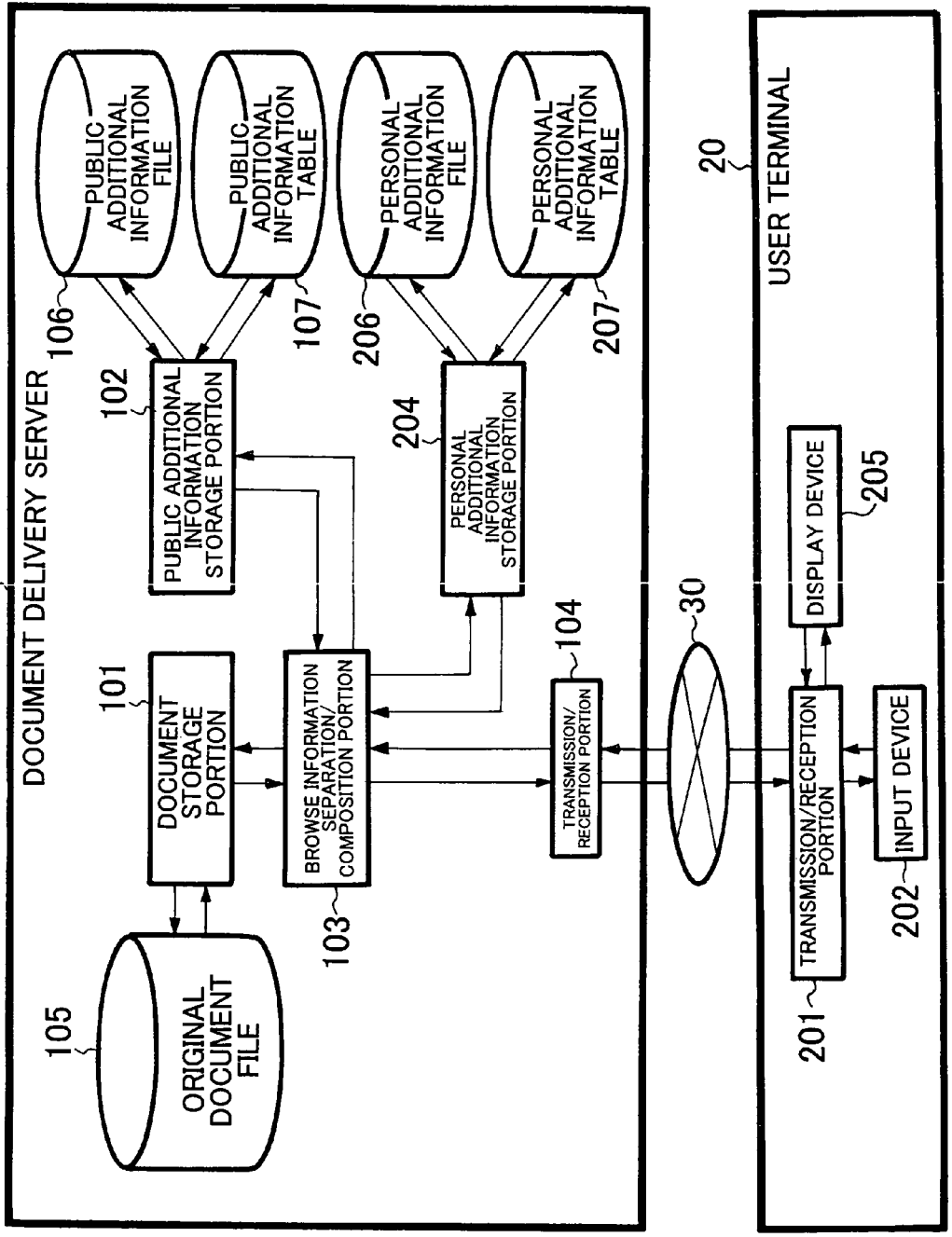
FIG. 13 shows a block diagram of a fourth embodiment of a document public browse system according to the present invention.

FIG. 13 shows a block diagram of a fourth embodiment of a document public browse system (document management network system) according to the present invention. In the fourth embodiment, the personal additional information storage portion 204, personal additional information file 206, and personal additional information table 207 shown in FIG. 1 are arranged in the document delivery server 10, while the browse information separation/composition portion 203 is not arranged, and the browse information separation/composition portion 103 of the document delivery server 10 has part of the function of the browse information separation/composition portion 203 (information processing together with the personal additional information storage portion 204).

In the fourth embodiment, memory capacity and a load of information processing in the user terminal 20 can be reduced, which can simplify the configuration of the user terminal 20. This configuration is effective in case the user terminal 20 is portable information equipment or the like.

Fifth Embodiment

Figure 14:
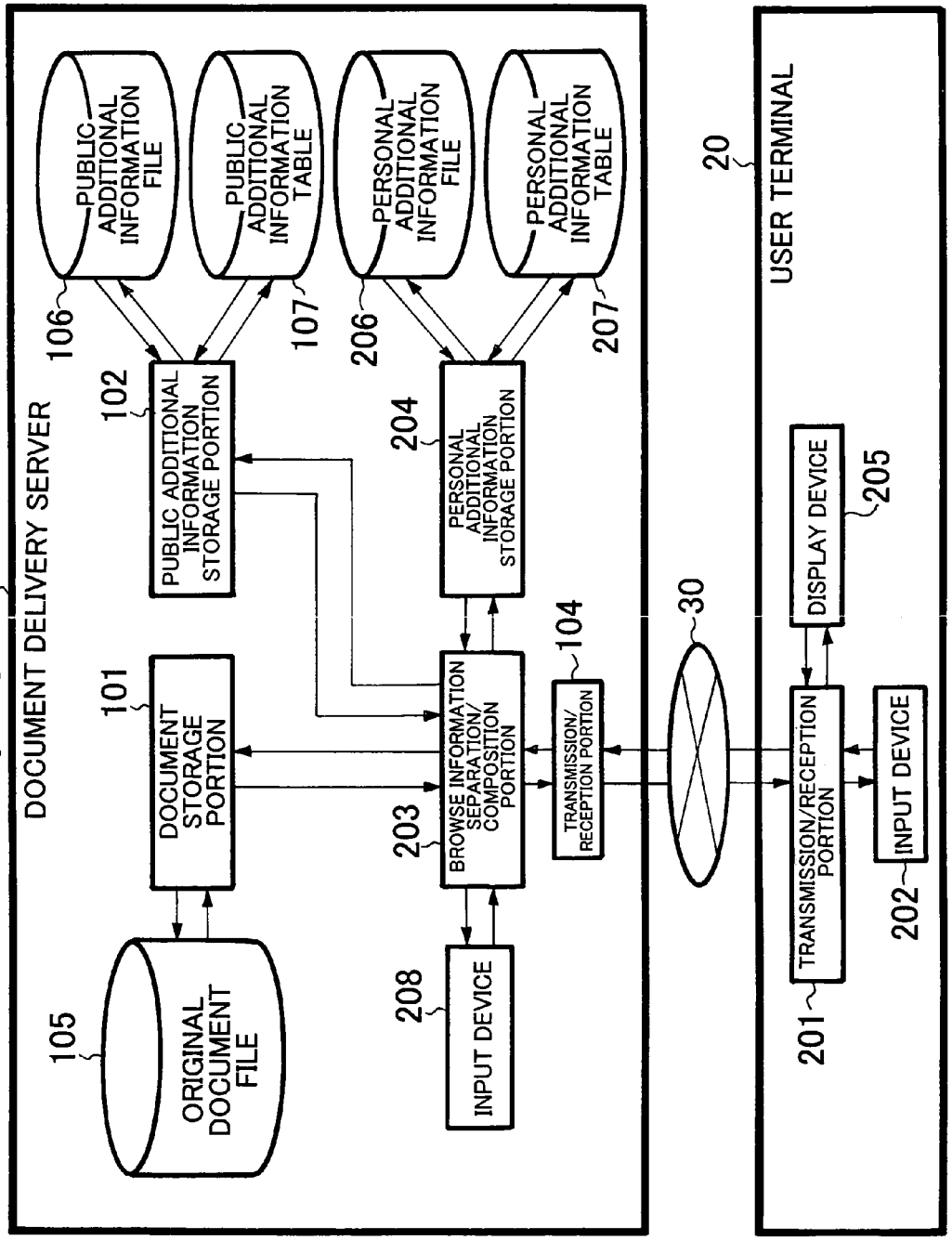
FIG. 14 shows a block diagram of a fifth embodiment of a document public browse system according to the present invention.

FIG. 14 shows a block diagram of a fifth embodiment of a document public browse system (document management network system) according to the present invention. In the fifth embodiment, an input device 208 is arranged in the document delivery server 10 of the system shown in FIG. 1, making it possible to input additional information thereat, and the user terminal 20 does not input additional information and is intended only for browse of information.

Figure 15:
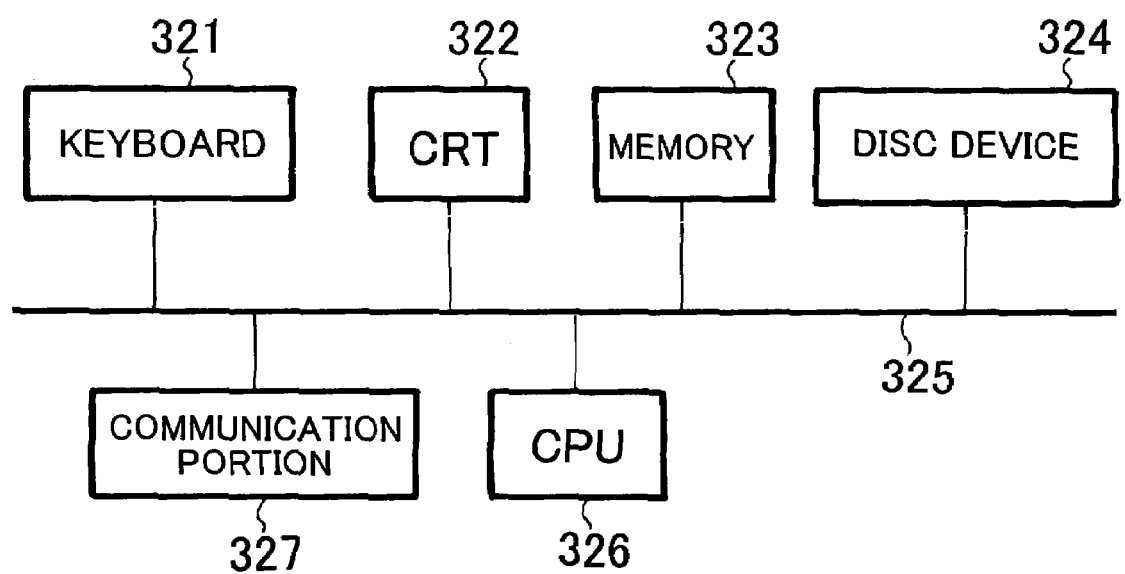
FIG. 15 shows a diagram indicative of the configuration of a computer.

The document delivery server 10, user terminal 20 and document management apparatus 40 described in the respective embodiments can be constituted by a computer shown in FIG. 15. The document delivery server 10, user terminal 20 and document management apparatus 40 may be constituted by a plurality of computers.

A document ID, user ID, original document information, public additional information, information on the public additional information table, personal additional information and information on the personal additional information table are stored in a storage portion, for example, in a memory 323 such as a DRAM or a disc device 324 such as an MO, hard disc, or the like. CPU 326 performs the function of the document storage control portion 101, public additional information storage control portion 102, browse information separation/composition portions 103 and 203, and personal additional information storage control portion 204, and carries out information processings based on programs for performing the respective processings previously explained using FIGS. 7 to 10 (programs are stored in the disc device 324). Keyboard 321 works as an input device for inputting data, while CRT 322 works as a display device for displaying a document image having additional information added thereto. Bus 325 is a bus such as a data bus, and communication portion 327 communicates with respective terminals.

What is claimed is:

1. A document management network system comprising:
    a document delivery server with a first memory portion, a first storage control portion, and a first information processing portion; and
    a terminal with an input portion that inputs a document identification and a user identification, a display portion, a second memory portion, a second storage control portion, and a second information processing portion, said terminal connected to said document delivery server through a network, wherein,
    said first storage control portion is configured to write to the first memory portion and read out from the first memory portion a first information based on one of i) document identification provided by said terminal, and ii) a combination of the document identification and user identification provided by said terminal,
    said first information processing portion is configured to transmit the first information read out by said first storage control portion to said terminal,
    said second storage control portion is configured to write to the second memory portion and read out from the second memory portion a second information based on one of i) the document identification and ii) a combination of the document identification and the user identification,
    original document content is stored in one of said first memory portion and said second memory portion as at least a portion of one of said first information and said second information,
    public additional document content that can be made public and is stored as at least a portion of one of said first information and said second information,
    personal additional document content is stored as at least a portion of one of said first information and said second information,
    at least one of said public additional document content and said personal additional document content include at least one of markers and text, and further include a display location of the at least one of markers and text, within a display of the original document content,
    said second information processing portion is configured to combine the first information transmitted from said document delivery server with the second information into a combined document for display on the display portion,
    and at least one of said public additional document content and said personal additional document content is an information for combining with said original document content and editing said original document content.

2. The document management network system according to claim 1, wherein the original document content is stored in said first memory portion.

3. The document management network system according to claim 1, wherein
    said first memory portion comprises an original document information memory portion, and a public additional information memory portion, said first storage control portion comprises i) an original document information storage control portion that stores the original document content to said original document information memory portion based on the document identification and reads out the original document content from said original document information memory portion based on the document identification, and ii) a public additional information storage control portion that stores the public additional document content to said public additional information memory portion based on the document identification and the user identification and reads out the public additional document content from said public additional information memory portion based on the document identification and the user identification, said first information processing portion is configured to transmit the original document content read out by said original document information storage control portion and the public additional document content read out by said public additional information storage control portion to said terminal, and said second storage control portion stores the personal additional document content to said second memory portion based on the document identification, and reads out the personal additional document content from said second memory portion based on the document identification.

4. A document management apparatus comprising:
an input portion that inputs document identification and user identification;
a first memory portion that includes original document content;
a first storage control portion that stores the original document content into said first memory portion and reads out the original document content from said first memory portion based on the document identification;
a second memory portion that includes public additional document content that can be made public and is combinable to the original document content;
a second storage control portion that stores the public additional document content into said second memory portion and reads out the public additional document content from said second memory portion based on the document identification and the user identification;
a third memory portion that includes personal additional document content that is combinable to the original document content;
a third storage control portion that stores the personal additional document content into said third memory portion and reads out the personal additional document content from said third memory portion based on the document identification; and
an information processing means that combines the original document content read out by said first storage control portion, the public additional document content read out by said second storage control portion, and the personal additional document content read out by said third storage control portion as a combined document for display, wherein
at least one of said public additional document content and said personal additional document content include at least one of markers and text, and further include a display location of the at least one of markers and text within a display of the original document content.

5. A document management method comprising the steps of:
inputting document identification and user identification;
reading out original document content stored in a first memory means based on the document identification;
reading out public additional document content stored in a second memory means which can be made public and associated with the original document content based on the inputted document identification and the inputted user identification;
reading out personal additional document content stored in a third memory means associated with the original document content based on the inputted document identification; and
displaying the read out original document content, the read out public additional document content and the read out personal additional document content as a combined document,
wherein at least one of said public additional document content and said personal additional document content is displayed with elements of said original document content.

6. A program product embodied on a storage unit of a computer and comprising code that, when said program product is executed, cause said computer to perform a document management method comprising the steps of:
inputting document identification and user identification;
reading out original document content stored in a first memory means based on the document identification;
reading out public additional document content stored in a second memory means which can be made public and associated with the original document content based on the inputted document identification and the inputted user identification;
reading out personal additional document content stored in a third memory means associated with the original document content based on the inputted document identification; and
displaying the read out original document content, the read out public additional document content and the read out personal additional document content as a combined document,
wherein at least one of said public additional document content and said personal additional document content occupies a display space with elements of said original document content.

7. The document management method according to claim 5, wherein the original document content includes at least one of characters and figures.

8. The document management method according to claim 7, wherein the original document content includes both characters and figures.

9. The document management method according to claim 5, wherein the public additional document content and the personal additional document content including at least one of markers and text information.

10. The document management method according to claim 9, wherein the public additional document content and the personal additional document content further includes coordinate information associated with the at least one of markers and text information.

11. The document management method according to claim 6, wherein the original document content includes at least one of characters and figures.

12. The document management method according to claim 11, wherein the original document content includes both characters and figures.

13. The document management method according to claim 6, wherein the public additional document content and the personal additional document content including at least one of markers and text information.

14. The document management method according to claim 13, wherein the public additional document content and the personal additional document content further includes coordinate information associated with the at least one of markers and text information.

15. The document management network system according to claim 1,
wherein said personal additional content is used by a particular person and is released only to the particular person.

16. A document management apparatus comprising:
an input portion that inputs document identification and user identification;
a first memory portion that includes original document content;
a first storage control portion that stores the original document content into said first memory portion and reads out the original document content from said first memory portion based on the document identification;
a second memory portion that includes public additional document content that can be made public and is combinable to the original document content;
a second storage control portion that stores the public additional document content into said second memory portion and reads out the public additional document content from said second memory portion based on the document identification and the user identification;
a third memory portion that includes personal additional document content that is combinable to the original document content;
a third storage control portion that stores the personal additional document content into said third memory portion and reads out the personal additional document content from said third memory portion based on the document identification; and
an information processing means that combines the original document content read out by said first storage control portion, the public additional document content read out by said second storage control portion, and the personal additional document content read out by said third storage control portion as a combined document for display,
wherein said personal additional document content is used by a particular person and is released only to the particular person, and
wherein at least one of said public additional document content and said personal additional document content is an information for combining with said original document content and editing said original document content.

* * * * *